Patented May 6, 1947

2,420,210

UNITED STATES PATENT OFFICE 2,420,210

TETRAACYLRIBONYL-XYLIDINE

Max Tishler, Rahway, N. J., assignor to Merck & Co., Inc., Rahway, N. J., a corporation of New Jersey No Drawing. Application September 12, 1945, Serial No. 615,929

6 Claims. (Cl. 260—211)

This invention relates generally to improvements in methods of preparing organic compounds and more particularly is concerned with a novel method for the synthesis of secondary amines useful in the manufacture of riboflavin. This is a continuation-in-part of the application Serial No. 458,786, filed September 18, 1942, for "Chemical compounds and process of preparing same."

In an industrial synthesis of riboflavin, xylidine is condensed reductively with a tetraacylribononitrile, which can be obtained by dehydration of the corresponding tetraacylribonamide. The N-tetraacylribityl-xylidine thus obtained is coupled with an aryl-diazonium halide, reduced to the corresponding amino compound, and this compound is condensed with alloxan or the like to yield tetraacyl riboflavin, which is then deacylated to produce riboflavin.

The present invention is concerned with a method for preparing one of the intermediates useful in this synthesis, N-tetra-acylribityl-xylidine. In accordance with this invention, a substituted amide, prepared for example by condensing a lactone with an amine, is reacted with a phosphorous halide or oxyhalide and the halogen-substituted imino compound thus obtained is reduced to yield the desired secondary amine. The reactions involved can be represented, in terms of the functional groups involved, substantially as follows:

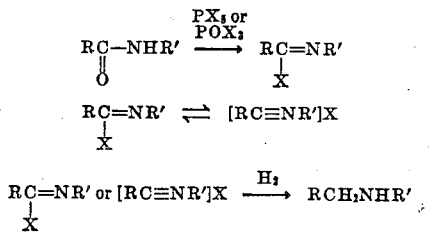

wherein R and R' are organic radicals or hydrogen and X is halogen. For instance, in the synthesis of N-tetraacetylribityl-xylidine, N-tetraacetylribonyl-xylidine is treated with a phosphorous halide or oxyhalide to yield dimethyl-(1'-chloro-tetraacetylribonimino)-benzene which is then reduced to the desired product.

The following examples will illustrate the present invention, though it is to be understood that these examples are given in illustration and not in limitation thereof.

EXAMPLE 1

PREPARATION OF 3,4-DIMETHYL-N-TETRAACETYL-RIBITYL ANILINE

1. *Synthesis of 3,4-dimethyl-N-tetraacetylribonyl-aniline.*—About 12.1 g. of 3,4-dimethyl-aniline, approximately 15 g. of ribonic acid lactone and 0.05 g. of hydroquinone are fused together on a steam bath and, after heating about one hour, the mixture solidifies to yield a straw colored residue. This residue is added to a mixture of about 60 cc. of acetic anhydride and about 40 cc. of pyridine, and the mixture is agitated, with cooling, until solution is complete. After further cooling and standing, treatment with activated charcoal and pouring on cracked ice, a gum which rapidly solidifies is obtained. Crystallization of this material from cyclohexane or ethanol yields 3,4-dimethyl-N-tetraacetylribonyl-aniline as needles, melting at 114°–115° C.

2. *Synthesis of 3,4-dimethyl-(1'-chloro-tetraacetylribonimino)benzene.*—About 30.6 g. of 3,4-dimethyl-N-tetraacetylribonyl-aniline are dissolved in approximately 200 cc. of chloroform, in a suitable container providing protection from the atmosphere, and approximately 15 g. of phosphorous pentachloride are added rapidly with agitation. After stirring about one hour, the mixture is concentrated to an oil under vacuum in an inert atmosphere, after which about 150 cc. of xylene are added and the concentration is repeated. Following a further addition of xylene and further concentration, the product is dissolved in a small quantity of xylene, chilled, and petroleum ether is added to cause precipitation of the product. After filtering, washing, and drying, a yield of about 28–29 g. of the desired product, having a melting point of 68–70° C., is obtained.

3. *Synthesis of 3,4-dimethyl-N-tetraacetylribityl-aniline.*—About 28–29 g. of 3,4-dimethyl-(1'-chloro-tetraacetylribonimino)-benzene are mixed with 100 cc. of ethyl acetate, and about 10 g. of a mixture comprising 5 parts by weight of palladium catalyst and 95 parts by weight of barium carbonate are added. These materials are shaken together for about one hour, the catalyst is removed by centrifugation, washed, and the washings and solution are combined and placed in an appropriate hydrogenation flask provided with a suitable heating element. About 10 g. of the palladium-barium carbonate mixture are added and, while maintaining the flask contents at about 50°–55° C., the mixture is hydrogenated at approximately thirty pounds superatmospheric pressure, the hydrogen being utilized at the rate of about two to three pounds per hour. The reduction is completed in three to four hours, after which the catalyst is removed by filtration, washed and the washing is combined with the filtrate, which is thereafter concentrated under vacuum in an inert atmosphere, to yield a viscid oil. The oil is treated with about 25 cc. of methanol, from which the product 3,4-dimethyl-N-tetraacetylribityl-aniline, is obtained as white needle-like crystals. The first crop of crystals melts at 98°–99° C., a second crop obtained by addition of water and chilling, melts at 94°–95° C. The total yield is about 18 g.

EXAMPLE 2

PREPARATION OF 3,4-DIMETHYL-N(TETRAPROPIONYL-D-RIBITYL)ANILINE

1. *Synthesis of 3,4-dimethyl-N(tetrapropionyl-d-ribonyl) aniline.*—The crude straw-colored residue prepared in accordance with Example 1 is recrystallized from ethanol to produce pure 3,4-dimethyl-N-d-ribonyl aniline. (M. P. 162–164° C.) About 23.3 g. of this purified material is added to a mixture of about 71 cc. of propionic anhydride and about 35 cc. of pyridine, and the mixture is agitated at approximately 45–50° C. until solution is complete. The light yellow solution is allowed to stand for approximately 20 hrs., and is then evaporated under reduced pressure at about 60° C. The residual oil is then mixed with about 100 cc. of water, the mixture is stirred approximately 3 hrs., the water decanted and the gummy residue is dissolved in chloroform. The chloroform solution is shaken with an aqueous solution of sodium bicarbonate, dried over sodium sulfate and decolorized with activated charcoal. The chloroform solution is then vacuum distilled to produce a colorless oil, 3,4-dimethyl-N-(tetrapropionyl-d-ribonyl) aniline. (Yield 36.2 g.; 84.7% theory.) Thorough drying of this oil yields material which crystallizes upon standing and which, upon purification, melts at 53–55° C.

2. *Synthesis of 3,4-dimethyl-(1'-chlorotetrapropionyl-d-ribonimino)- benzene.*—About 10.5 gms. of 3,4-dimethyl-N-(tetrapropionyl-d-ribonyl) aniline are dissolved in approximately 65 cc. of alcohol-free chloroform, in a suitable container providing protection from the atmosphere, and approximately 4.9 gms. of phosphorous pentachloride are added rapidly with agitation. After stirring for about one hour at room temperature the mixture is concentrated to an oil under vacuum. The residual phosphorous oxychloride is removed by repeatedly adding xylene and distilling the xylene under reduced pressure. The oil is decolorized by treating its solution in about 30 g. of xylene with activated charcoal and the xylene is distilled to produce a yellow oil, 3,4-dimethyl-N-(1'-chlorotetrapropionyl ribonimino) benzene. (Yield 10.1 g.; 92.8% theory.)

3. *Synthesis of 3,4-dimethyl-N-(tetrapropionyl-d-ribityl) aniline.*—About 10 g. of the 3,4-dimethyl-N-(1'-chlorotetrapropionyl ribonimino) benzene prepared above are dissolved in 50 cc. of ethyl acetate and the solution is placed in a hydrogenation flask provided with a suitable heating element. About 10 g. of the mixture comprising 5 parts by weight of palladium catalyst and 95 parts by weight of barium carbonate are added and, while maintaining the flask contents at about 68–70° C., the mixture is hydrogenated at approximately 30–40 lbs./sq. in. atmospheric pressure. The reduction is completed in approximately seven hours, after which the catalyst is removed by filtration. The filtrate and washings are decolorized by treatment with activated charcoal, the charcoal removed by filtration, and the filtrate and washings combined and concentrated under reduced pressure to constant weight to produce a pale yellow oil, 3,4-dimethyl-N-(tetrapropionyl - d - ribityl) aniline. B. P.=130° C. at .5 micron pressure. (Yield 9.3 g.; 94.8% theory.)

For identification, .5 g. of the crude 3,4-dimethyl-N-(tetrapropionyl-d-ribityl) aniline is dissolved in 2 cc. of glacial acetic acid and added to a solution of p-nitrobenzene diazonium sulfate prepared by mixing, at a temperature of 0–10° C., .25 g. of p-nitroaniline, 6 cc. glacial acetic acid, 3.7 cc. water, 0.2 cc. concentrated sulfuric acid, and .13 g. of sodium nitrite. The crude red oil which separates, crystallizes on standing and is recrystallized from methanol to produce pure 6-(p-nitrophenyl azo)-3,4-dimethyl-N-(tetrapropionyl-d-ribityl) aniline. M. P. 98–100° C.

EXAMPLE 3

PREPARATION OF 3,4-DIMETHYL-N-(TETRABUTYRYL-D-RIBITYL)ANILINE

1. *Synthesis of 3,4-dimethyl-N-(tetrabutyryl-d-ribonyl) aniline.*—About 13.5 g. of 3,4-dimethyl-N-d-ribonyl aniline (M. P. 162–164° C.) is added to a mixture of about 57.6 cc. of butyric anhydride and about 20 cc. of pyridine, and the mixture is agitated at approximately 70–80° C. until solution is complete. The light yellow solution is allowed to stand for approximately 24 hours, and is then evaporated under reduced pressure at about 60° C. to a final weight of approximately 31 g. The residual oil is then mixed with about 100 cc. of water, the mixture is stirred at room temperature approximately 22 hrs., the water decanted and the water extraction repeated twice, each time using 100 cc. of water. The gummy residue is dissolved in chloroform and the chloroform solution is shaken with an aqueous solution of sodium bicarbonate, dried over sodium sulfate and decolorized with activated charcoal. The chloroform solution is then vacuum distilled to produce a colorless oil, 3,4-dimethyl-N-(tetrabutyryl-d-ribonyl) aniline; B. P. 150° C. at .5 micron pressure. (Yield 22.4 g.; 83.2% theory.)

2. *Synthesis of 3,4-dimethyl-(1'-chlorotetrabutyryl-d-ribonimino) benzene.*—About 11.4 gms. of 3,4-dimethyl-N-(tetrabutyryl-d-ribonyl) aniline are dissolved in approximately 65 cc. of alcohol-free chloroform, in a suitable container providing protection from the atmosphere, and approximately 4.8 gms. of phosphorus pentachloride are added rapidly with agitation. After stirring for about one hour at room temperature the mixture is concentrated to an oil under vacuum. The residual phosphorus oxychloride is removed by repeatedly adding xylene and distilling the xylene under reduced pressure. The oil is decolorized by treating its solution in about 30 g. of xylene with activated charcoal and the xylene is distilled to produce a yellow oil, 3,4-dimethyl-N-(1'-chlorotetrabutyryl ribonimino) benzene. (Yield 11.4 g.; 98.3% theory.)

3. *Synthesis of 3,4-dimethyl-N-(tetrabutyryl-d-ribityl) aniline.*—About 11.4 g. of the 3,4-dimethyl - N - (1' - chlorotetrabutyryl ribonimino) benzene prepared above are dissolved in 50 cc. ethyl acetate and the solution is placed in a hydrogenation flask provided with a suitable heating element. About 11 g. of a mixture comprising 5 parts by weight of palladium catalyst and 95 parts by weight of barium carbonate are added and, while maintaining the flask contents at about 68–70° C., the mixture is hydrogenated at approximately 30–40 lbs./sq. in. superatmospheric pressure. The reduction is completed in approximately 4–5 hours, after which the catalyst is removed by filtration. The filtrate and washings are decolorized by treatment with activated charcoal, the charcoal removed by filtration, and the filtrate and washings combined and concentrated under reduced pressure to constant weight to produce a mobile yellow oil, 3,4-dimethyl-N-(tetrabutyryl-d-ribityl) aniline. B. P.=130° C. at .5 micron pressure. (Yield 10.1 g.; 93.6% theory.)

For identification .75 g. of the crude 3,4-dimethyl-N-(tetrabutyryl-d-ribityl) aniline is dissolved in 2 cc. of glacial acetic acid and added to a solution of p-nitrobenzene diazonium sulfate prepared using the same quantities and in the same manner as described under Example 2, part 3, above. The gummy material which separates is allowed to stand approximately 20 hrs. at 0–5° C. and is recrystallized twice from methanol to produce pure 6-(p-nitrophenyl azo)-3,4-dimethyl-N-(tetrabutyryl-d-ribityl) aniline. M. P. 89–90° C.

Other N-tetraacylribityl-xylidines can be prepared by employing different N-tetraacyl ribonyl xylidines, as for example, N-tetravaleryl ribonyl xylidine, N-tetrabenzoyl ribonyl xylidine, N-tetraphenylacetyl ribonyl xylidine, and the like.

Modifications may be made in carrying out the present invention without departing from the spirit and scope thereof, and the invention is to be limited only by the appended claims.

I claim:

1. 3,4-dimethyl-N-tetraacylribonyl-aniline.
2. A compound represented by the formula:

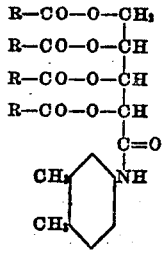

wherein R is alkyl.

3. A compound represented by the formula:

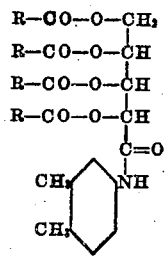

wherein R is aryl.

4. 3,4-dimethyl-N-tetrapropionyl ribonyl-aniline.
5. 3,4-dimethyl-N-tetrabenzoyl ribonyl-aniline.
6. 3,4-dimethyl-N-tetraacetyl-ribonyl-aniline.

MAX TISHLER.